United States Patent
Christopher et al.

(10) Patent No.: US 9,032,200 B2
(45) Date of Patent: May 12, 2015

(54) METHOD OF INSTALLING VIRTUAL SERVICE PROCESSOR (VSP) TO COMPUTING DEVICE AND APPLICATION OF THE SAME

(71) Applicant: American Megatrends, Inc., Norcross, GA (US)

(72) Inventors: Samvinesh Christopher, Suwanee, GA (US); Varadachari Sudan Ayanam, Suwanee, GA (US); Joseprabu Inbaraj, Suwanee, GA (US); Baskar Parthiban, Johns Creek, GA (US)

(73) Assignee: American Megatrends, Inc., Norcross, GA (US)

(*) Notice: Subject to any disclaimer, the term of this patent is extended or adjusted under 35 U.S.C. 154(b) by 322 days.

(21) Appl. No.: 13/828,377

(22) Filed: Mar. 14, 2013

(65) Prior Publication Data
US 2014/0281449 A1   Sep. 18, 2014

(51) Int. Cl.
*G06F 1/24* (2006.01)
*G06F 15/177* (2006.01)
*G06F 9/44* (2006.01)
*G06F 9/455* (2006.01)
*G06F 9/445* (2006.01)
*G06F 9/50* (2006.01)

(52) U.S. Cl.
CPC .......... *G06F 9/4403* (2013.01); *G06F 9/45533* (2013.01); *G06F 15/177* (2013.01); *G06F 9/455* (2013.01); *G06F 8/61* (2013.01); *G06F 9/45558* (2013.01); *G06F 9/5077* (2013.01)

(58) Field of Classification Search
CPC ....... G06F 8/61; G06F 9/455; G06F 9/45533; G06F 9/45558; G06F 9/5077; G06F 15/177
USPC ........... 713/1, 2, 100; 709/220, 221; 717/168; 718/1
See application file for complete search history.

(56) References Cited

U.S. PATENT DOCUMENTS

2009/0249319 A1* 10/2009 Bai et al. .................. 717/168

* cited by examiner

*Primary Examiner* — Michael J Brown
(74) *Attorney, Agent, or Firm* — Morris Manning & Martin, LLP; Tim Tingkang Xia, Esq.

(57) ABSTRACT

Method, system, and storage media for remotely installing a virtual service processor (VSP) to a computing device are disclosed. The computer device initiates a preboot execution environment (PXE) client and receives a VSP installation file from a PXE server. The VSP installation file includes a VSP file, a universal plug and play (UPnP) service file, and a remote procedure call (RPC) service file. The UPnP service is discoverable by a management station in a network through UPnP. The computer device initiates a RPC service based on the RPC service file, sends hardware information of the computing device to the management station through the RPC service, receives configuration parameters for the VSP through the RPC service. The RPC service installs the VSP based on the VSP installation file and the configuration parameters.

25 Claims, 6 Drawing Sheets

METHOD OF INSTALLING VIRTUAL SERVICE PROCESSOR (VSP) TO COMPUTING DEVICE AND APPLICATION OF THE SAME

FIELD

The present disclosure relates to the field of computer systems, and particularly to methods of installing a virtual service processor (VSP) to a computing device.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A service processor (SP) or a baseboard management controller (BMC) refer to a specialized microcontroller that manages the interface between system management software and platform hardware. The SP can be embedded on the motherboard of a computer, generally a server. Thus, different types of sensors can be built into the computer system, and the SP reads these sensors to obtain parameters such as temperature, cooling fan speeds, power status, operating system (OS) status, etc. The SP monitors the sensors and can send alerts to a system administrator via the network if any of the parameters do not stay within preset limits, indicating a potential failure of the system. The administrator can also remotely communicate with the SP to take some corrective action such as resetting or power cycling the system to get a hung OS running again.

However, there are computer systems or servers with no space available for a physical SP or BMC on the server hardware due to high number of systems packed within a small chassis. For example, some computer systems have packed hardware with all existing hardware elements embedded therein, and modification of the existing hardware elements is difficult and may be destructive to the computer system. In this case, a virtual service processor (VSP) can provide a suitable solution. The VSP is a unique piece of software stack which works below the actual OS used on the server. The VSP virtualizes a complete SP or BMC hardware and the functionality while no physical SP or BMC hardware is present on the system. Running on the in-band space on the processor of a server, the VSP offers a comprehensive manageability which is consistent across all other traditional server management solutions.

Generally, for a computer system using the VSP to virtualize the SP functionality, the VSP is installed in the computer system in the form of a hypervisor, which a hardware virtualization techniques allowing more than one operating system (OS), termed guests, to run concurrently on a host computer. After installing the hypervisor together with the VSP, one or more OS may be installed to the computer system to serve as the guest OS. Thus, in operation, the computer system runs the hypervisor together with the VSP software directly, and the hypervisor runs the OS and manages the execution the OS. In other words, the hypervisor is a virtual operating platform of the OS.

However, for a "headless" computer system, i.e. a computer system with no monitor, keyboard, or mouse, the user typically cannot install the VSP manually to the headless computer system. An example of the headless computer system is a headless server connected to a network, which is remotely accessible by the administrator from a client machine. Therefore, a heretofore unaddressed need still exists in the art to address the aforementioned deficiencies and inadequacies.

SUMMARY

Certain aspects of the present disclosure are directed to a method of remotely installing a virtual service processor (VSP) to a computing device. The method include: initiating a preboot execution environment (PXE) client at the computing device; receiving, at the PXE client, a VSP installation file from a PXE server, wherein the VSP installation file includes a VSP file, a universal plug and play (UPnP) service file, and a remote procedure call (RPC) service file; initiating a UPnP service based on the UPnP file at the computing device, wherein the UPnP service is discoverable by a management station in a network through UPnP; initiating a RPC service based on the RPC service file at the computing device; in response to a request from the management station and received at the RPC service, sending, at the computing device, hardware information of the computing device to the management station through the RPC service; receiving, at the computing device, configuration parameters for the VSP through the RPC service, wherein the configuration parameters configure functions of the VSP for managing at least one health or performance related aspect of the computing device; and installing, by the RPC service, the VSP on the computing device based on the VSP installation file and the configuration parameters.

In certain embodiments, the method includes executing, at the management station, a VSP installer application; requesting, by the VSP installer application, the hardware information of the computing device through the RPC service at the computing device; receiving, by the VSP installer application, the hardware information of the computing device through a RPC client at the management station communicating with the RPC service; and sending, by the VSP installer application, the configuration parameters determined based on the received hardware information to the computing device through the RPC service.

In certain embodiments, the method includes: discovering, by the PXE client, the PXE server; sending, by the PXE client, a request to download the VSP installation file from the PXE server; and receiving, at the computing device, the VSP installation file sent from the PXE server. In certain embodiments, the method includes: initiating a UPnP control point at the management station, wherein the UPnP control point is configured to discover the UPnP service.

In certain embodiments, the method includes: initiating, at the management station, an RPC client; generating, by the VSP installer application, the request for the hardware information of the computing device; packing, by the RPC client, the request, and sending the packed request to the RPC service of the computing device; unpacking, by the RPC service, the packed request, and obtaining the hardware information from the computing device according to the unpacked request; packing, by the RPC service, the hardware information, and sending the packed hardware information to the RPC client via the network; and unpacking, by the RPC client, the packed hardware information, and sending the unpacked hardware information to the VSP installer application.

In certain embodiments, the method includes generating, by the VSP installer application, the configuration parameters based on the hardware information of the computing device;

packing, by the RPC client, the configuration parameters, and sending the packed configuration parameters to the RPC service of the computing device; unpacking, by the RPC service, the packed configuration parameters; and storing the VSP file at the computing device and configuring the VSP in accordance with the configuration parameters.

In certain embodiments, the method includes: periodically sending information regarding installation progress from the RPC service to the management station; and displaying the installation progress at the management station. In certain embodiments, a BIOS of the computing device contains the PXE client. In certain embodiments, the computing device is a headless computer system having no monitor, keyboard, or mouse.

Certain aspects of the present disclosure are directed to a system for remotely installing a virtual service processor (VSP). The system includes a computing device, which includes a preboot execution environment (PXE) client initiated at the computing device. The PXE client is configured to receive a VSP installation file from a PXE server. The VSP installation file includes a VSP file, a universal plug and play (UPnP) service file, and a remote procedure call (RPC) service file. The computing device also includes a UPnP service initiated based on the UPnP file at the computing device. The UPnP service is discoverable by a management station in a network through UPnP. The computing device also includes a RPC service initiated based on the RPC service file at the computing device. The RPC service is configured to in response to a request from the management station and received at the RPC service, send hardware information of the computing device to the management station through the RPC service; and receive, at the computing device, configuration parameters for the VSP through the RPC service. The configuration parameters configure functions of the VSP for managing at least one health or performance related aspect of the computing device. The RPC service is also configured to install the VSP on the computing device based on the VSP installation file and the configuration parameters.

Certain aspects of the present disclosure are directed to first and second non-transitory computer storage media having different computer-executable instructions stored thereon. The instructions, when executed respectively by processors of a computing device and a management station, cause the processor of the computing device to initiate a preboot execution environment (PXE) client and receive, at the PXE client, a VSP installation file from a PXE server. The VSP installation file includes a VSP file, a universal plug and play (UPnP) service file, and a remote procedure call (RPC) service file. The instructions also cause the processor of the computing device to initiate a UPnP service based on the UPnP file at the computing device. The UPnP service is discoverable by a management station in a network through UPnP. The instructions also cause the processor of the computing device to initiate a RPC service based on the RPC service file at the computing device; in response to a request from the management station and received at the RPC service, to send, at the computing device, hardware information of the computing device to the management station through the RPC service; and to receive configuration parameters for the VSP through the RPC service. The configuration parameters configure functions of the VSP for managing at least one health or performance related aspect of the computing device. The instructions also cause the processor of the computing device to install, by the RPC service, the VSP based on the VSP installation file and the configuration parameters.

These and other aspects of the present disclosure will become apparent from the following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the detailed description and the accompanying drawings, wherein.

DETAILED DESCRIPTION

The following description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the terms "headless", "headless system", "headless machine" or "headless server" generally refer to the a computer system, machine or server that has been configured to operate without a monitor (the missing "head"), keyboard, and mouse.

As used herein, the term "memory" generally refers to the physical devices used to store programs (sequences of instructions) or data (e.g. program state information) on a temporary or permanent basis for use in a computer or other digital electronic device. The terms "non-volatile memory" or "nonvolatile memory" refer to computer memory that can retain the stored information even when not powered, and the term "volatile memory" refers to computer memory that requires power to maintain the stored information.

As used herein, the term "preboot execution environment" or its abbreviation "PXE" generally refers to an environment to boot computers using a network interface independently of data storage devices or installed operating systems. PXE provides a way for network cards to initiate a network connection to servers before any OS is loaded so that the OS files can be downloaded over the network.

As used herein, the term "virtual machine" or its abbreviation "VM" generally refers to a software implementation or virtualized simulation of a machine (i.e. a computer) that executes programs like a physical machine. A VM may be based on specifications of a hypothetical computer or emulate the architecture and functioning of a real world computer.

As used herein, the term "guest operating system" or its abbreviation "guest OS" generally refers to the operating system being installed and run in a virtual machine. To run an operating system as the guest OS on a VM, the VM must be configured in the same way that a computer is configured to run the OS.

As used herein, the term "hypervisor" generally refers to a piece of computer software, firmware or hardware that creates and runs virtual machines.

As used herein, the term "communication" generally refers to communication through physical or non-physical connections between computer components or devices with or without intermediate communicating devices, links, interface or other intercommunicating media. Communication can be generally performed by, but not limited to, non-physical signals such as electronic, magnetic, optical or other types of signals.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

The terms "chip" or "computer chip", as used herein, generally refer to a hardware electronic component, and may refer to or include a small electronic circuit unit, also known as an integrated circuit (IC), or a combination of electronic circuits or ICs.

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The methods described herein may be implemented by one or more computer programs executed by one or more processors of a computer system. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Figure 1:
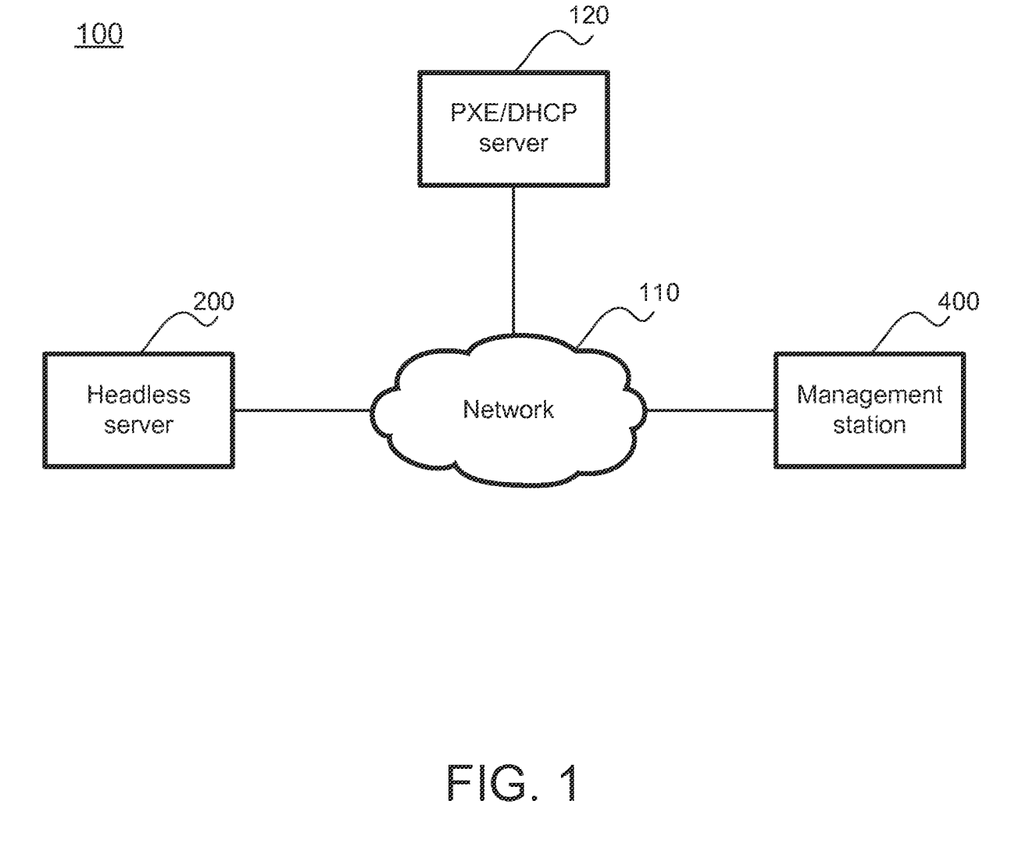
FIG. 1 schematically depicts a network system according to one embodiment of the present disclosure.

FIG. 1 schematically depicts a network system according to one embodiment of the present disclosure. As shown in FIG. 1, the network system 100 includes a network 110, which may be a wired or wireless network, and may be of various forms such as a local area network (LAN) or wide area network (WAN) including the Internet, or a combination of the various network forms. The system 100 includes a server 200 which may be a headless computer system and to which the VSP software is to be installed. The system 100 also includes a management station 400 that manages the installation of the VSP software. Further, the system 100 includes a PXE/DHCP server 120, which includes preboot execution environment (PXE) service for providing a booting software and dynamic host configuration protocol service for providing Internet protocol (IP) addresses to server or client machines connected to the network. Each of the headless server 200, the management station 400 and the PXE/DHCP server 120 is respectively connected to the network 110.

FIG. 1 shows each of the management station 400 and the PXE/DHCP server 120 as separate physical machines. In certain embodiments, however, any of these servers or stations, among others, may be implemented in combination by one single physical machine or separately as a group of physical machines. For example, the PXE/DHCP server 120 may be implemented by one single server providing PXE and DHCP services, or by a PXE server and a DHCP server respectively providing the services.

Figure 2:
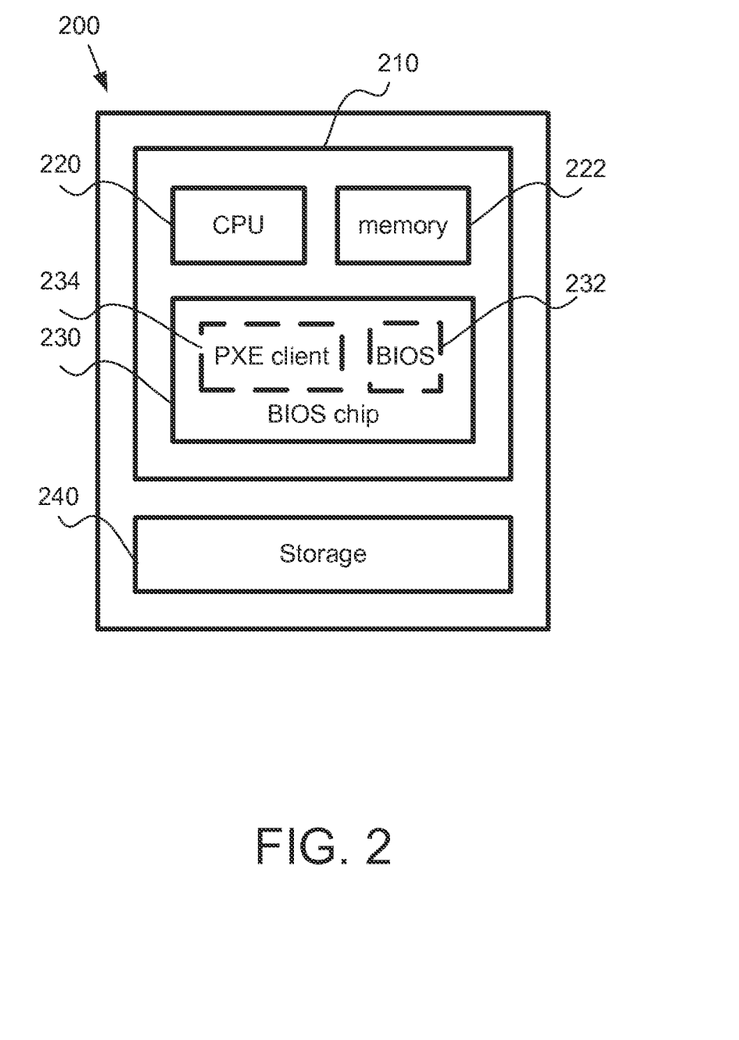
FIG. 2 schematically depicts a headless server having no existing OS according to one embodiment of the present disclosure.

FIG. 2 illustrates the headless server 200 of FIG. 1 according to one embodiment of the present disclosure. The headless server 200 has no monitor, keyboard, or mouse. Although not explicitly shown in FIG. 2, a chassis is provided to enclose various components or devices of the headless server 200. One of ordinary skill in the art would appreciate that the headless server 200 of FIG. 2 only represents an exemplary embodiment of the present disclosure, and therefore should not be considered to limit the disclosure in any manner. In certain embodiments, the headless server 200 may include other physical or virtual components not shown in FIG. 2.

The headless server 200 has a baseboard 210, or the "motherboard". The baseboard 210 is a printed circuit board to which a plurality of components or devices may be disposed thereon and be interconnected. The layout of the components on the baseboard 210 and the manner of the interconnection between the components on the baseboard 210 is herein referred to as the "configuration" of the baseboard. One of ordinary skill in the art would appreciate that the configuration of the baseboard 210 may be adjusted or changed according to the necessary design or manufacturing requirements.

As shown in FIG. 2, the components on the baseboard 210 include, but not limited to, a central processing unit (CPU) 220, a memory 222, a Basic Input/Output System (BIOS) chip 230, and other required memory and Input/Output (I/O) modules and components (not shown).

The CPU 220 is a host processor which is configured to control operation of the headless server 200. In some embodiments, one of ordinary skill in the art would appreciate that the headless server 200 may run on or more than one CPU as the host processor, such as two CPUs, four CPUs, eight CPUs, or any suitable number of CPUs.

The memory 222 can be a volatile memory, such as the random-access memory (RAM), for storing the data and information during the operation of the headless server 200.

The BIOS chip 230 is one of the most crucial components of the headless server 200 or any computer system. Generally, the BIOS chip 230 is a non-volatile chip, such as a flash memory chip, an EEPROM chip or a complementary metal oxide semiconductor (CMOS) memory. The BIOS chip 230 is in communication to the CPU 220, and is configured to store the BIOS software (hereinafter BIOS) 232 for performing startup functions of the headless server 200. Further, PXE client software 234 is also stored in the BIOS chip 230 for performing PXE remote booting, which will be described later.

Further, the headless server 200 can include a storage 240 for storing applications and data of the headless server 200. Examples of the storage 240 may include flash memory, memory cards, USB drives, hard drives, floppy disks, optical drives, or any other types of data storage devices. Although the storage 240 as shown in FIG. 2 is illustrated in one block, indicating the storage 240 as one physical storage device, implementation of the storage 240 may include a plurality of physical storage devices or virtual storage media. Various software applications may be stored in the storage 240.

Further, in certain embodiments, before installation of the VSP, no operating system (OS), which is a collection of software managing computer hardware resources and software programs, is stored in the storage 240.

As described above, the BIOS 232 can perform the startup functions, or the "booting" functions. In the booting process, the BIOS performs a power-on self-test operation, which initializes and identifies the system hardware devices, such as the CPU, memory and storage devices, display card, keyboard and mouse, and other hardware devices. The BIOS then attempts to boot the computer system, i.e., instructs the CPU to read and execute an OS from the devices as specified in the BIOS. Typically the BIOS attempts to load, i.e., instruct the CPU to read and execute, a boot loader software from a specified device. The boot loader software then loads an OS from that bootable device. Thus, the CPU can execute the OS and run an instance of the OS. Accordingly, the control of the computer system is given to the OS. This process is known as booting, or booting up, which is short for bootstrapping.

Referring back to FIG. 1, the PXE/DHCP server 120 is a computer server which provides PXE and DHCP services. PXE is an environment to boot computers and servers using a network interface independently of data storage devices (like hard disks) or installed OS, which is defined on a foundation of industry-standard Internet protocols and services that are widely deployed in the industry, namely TCP/IP, DHCP, and trivial file transfer protocol (TFTP). In other words, PXE allows a computer system to remotely boot with a booting software sent to the computer system by the PXE server.

DHCP is a network protocol used to configure network devices so that the devices may communicate to one another on an IP network. Specifically, a DHCP service receives requests for IP addresses from other devices on the network, and issues IP addresses in response to such requests such that other server and client machines on the network may identify the device with the IP address.

Typically, the PXE/DHCP protocols operates as follows. The client initiates the PXE protocol by broadcasting a DHCPDISCOVER packet, which contains an extension that identifies the request as coming from the client that implements the PXE protocol. Assuming that a DHCP server or a Proxy DHCP server implementing this extended protocol is available, after several intermediate steps, the PXE server sends the PXE client a list of appropriate boot servers. The PXE client then discovers a boot server of the type selected, and receives the name of an executable file on the chosen boot server. The PXE client then uses TFTP to download the executable from the boot server. Finally, the client initiates execution of the downloaded image for booting. At this point, the client's state must meet certain requirements that provide a predictable execution environment for the image. Important aspects of this environment include the availability of certain areas of the client's main memory, and the availability of basic network I/O services.

Figure 3:
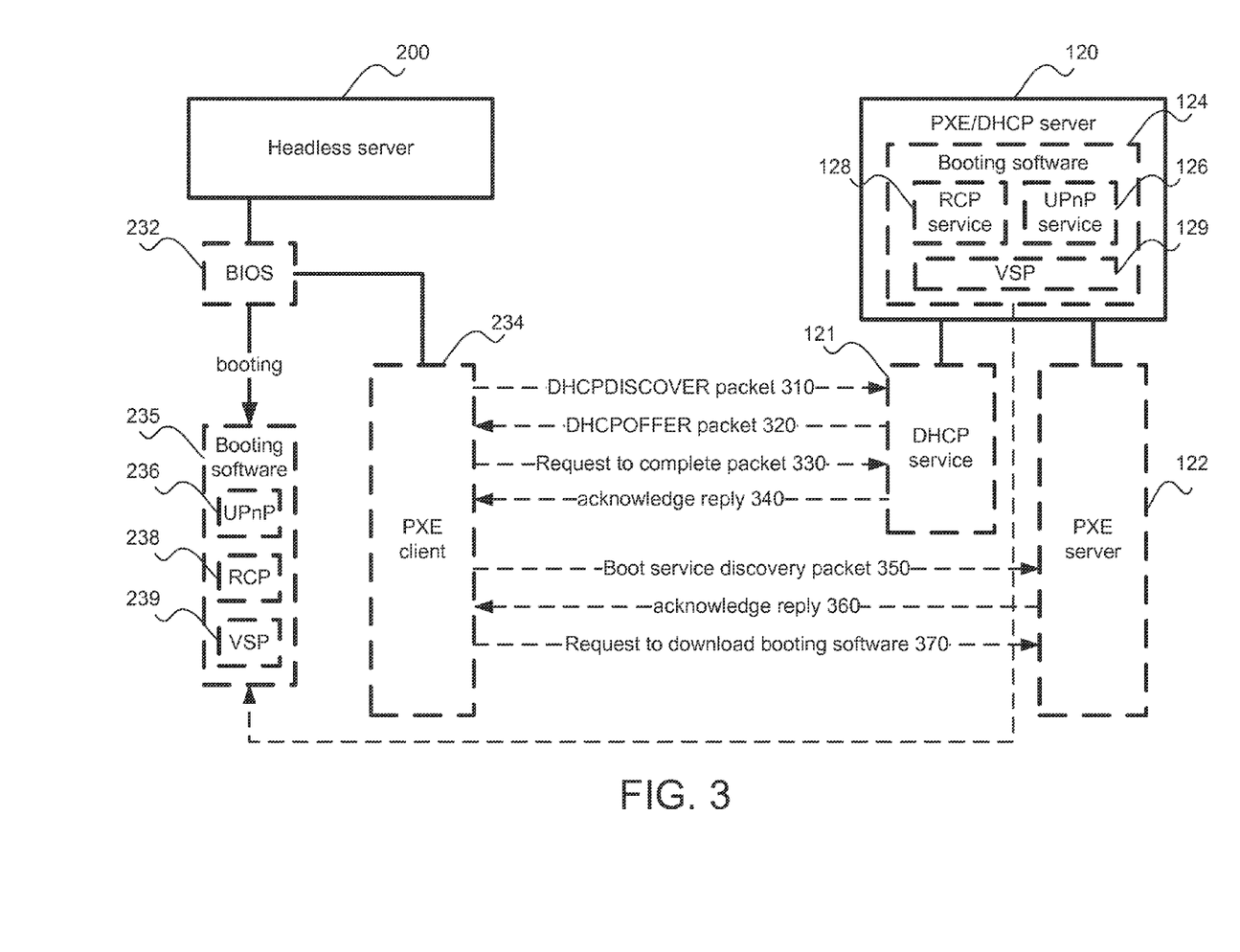
FIG. 3 schematically depicts data flows and execution of the remote booting process of the headless server by the PXE/DHCP server according to one embodiment of the present disclosure.

FIG. 3 shows the remote booting process of the headless server 200 by the PXE/DHCP server 120 according to one embodiment of the present disclosure, in which the solid lines indicate execution of software applications, and dashed lines indicate transfer of data. As shown in FIG. 3, the PXE/DHCP server 120 serves as a DHCP server and a PXE boot server, including the DHCP service 121, the PXE server 122 and a booting software 124. The booting software 124 can be remotely loaded by the headless server 200 through PXE. The booting software 124 includes, among other things, a UPnP service software 126, a RCP service software 128, and the VSP software 129. Although not explicitly shown, the headless server 200 and the PXE/DHCP server 120 may include other software and hardware elements to perform the remote booting process.

The BIOS 230 of the headless server 200 can be configured to execute the PXE client software 234 stored in the storage 240 upon detecting that no bootable device exists in the system.

Upon launching, the PXE client 242 attempts to locate the PXE/DHCP server 120 via the network 110 (not shown in FIG. 3A). Specifically, the PXE client 234 broadcasts, via the network 110, an extended DHCPDISCOVER packet 310 to port 67/UDP, which is the standard DHCP port. The extended DHCPDISCOVER packet 310 includes a regular DHCPDISCOVER packet information, which is extended with additional information of PXE options, such as PXE client extension tags, for showing the identity of the PXE client 234. The PXE options and extension tags identify the PXE client 234 being broadcasting the DHCPDISCOVER packet 310 as capable of performing PXE remote booting. Standard DHCP servers without PXE service would ignore such PXE options in the extended DHCPDISCOVER packet 310. On the other hand, the DHCP service 121 of the PXE/DHCP server 120, which operates with the PXE server software 122, would detect the PXE options in the extended DHCPDISCOVER packet 310.

When the DHCP service 121 of the PXE/DHCP server 120 detects the PXE options in the extended DHCPDISCOVER packet 310 broadcasted by the PXE client 234, the DHCP service 121 responds with an extended DHCPOFFER packet 320 to port 68, which is the standard DHCP port. The extended DHCPOFFER packet 320 includes PXE/DHCP configurations available for a PXE connection under the TFTP protocol, to the PXE client 234. The PXE/DHCP configurations include PXE server extension tags, other DHCP option tags, a client IP address for the PXE client 234, a boot server list, and other necessary discovery control options. In this embodiment, the boot server list includes information of the PXE server 122 such that the PXE client 234 may establish connection to the PXE server 122.

When the PXE client 234 receives the extended DHCPOFFER packet 320 from the PXE server 120, the PXE client 234 performs necessary configurations corresponding to one of the PXE configurations in the DHCPOFFER packet 320, such as selecting the PXE server 122, and a connection under the TFTP protocol can be established between the PXE client 234 of the headless server 200 and the PXE server 122. The PXE client 234 then sends a request to complete packet 330 to port 67 back to the DHCP service 121. Upon receiving the request to complete packet 330, the DHCP service 121 returns with an acknowledge reply 340 to port 68 back to the PXE client 242.

Then, the PXE client 234 sends a boot service discover packet 350 to port 67 or port 4011 of the PXE server 122, which is the standard PXE boot multicast or unicast port. The use of port 67 or port 4011 is determined by the discovery control options included in the DHCPOFFER packet 320. The boot service discover packet 350 includes information of the PXE/DHCP options of the PXE client 234, such as the PXE client extension tags, the DHCP option tags corresponding to the PXE server 122, and the IP address assigned by the DHCP service. Upon receiving the boot service discover packet 350, the PXE server 122 returns with an acknowledge reply 360 to the client source port. The acknowledge reply 360 includes information of the PXE/DHCP options of the PXE server 122, such as the PXE server extension tags, and information of the booting software 124, such as a list of filenames of the booting software 124, the UPnP service software 126, the RCP service software 128 and the VSP software 129, and other related information of the files.

When the PXE client 234 receives the acknowledge reply 360, the PXE client 234 sends a request to download the booting software 370 to port 69, which is the TFTP port. The request 370 includes the information of the files to be downloaded. The PXE server 120 responds to the request 370 by sending a copy of the booting software 235 to the headless server 200. The copy of the booting software 235 includes the UPnP service software 236, the RCP service software 238, and the VSP software 239. When the PXE client 234 receives the booting software 235, the BIOS 232 determines the place where the booting software 235 is stored. For example, the BIOS 232 may store the booting software 235 in the memory 222, or in the storage 240. Then, the BIOS 232 instructs the CPU 220 to boot the booting software 235.

When the booting software 235 is executed and launched on the headless server 200, the booting software 235 may perform additional settings and launch necessary software applications such that the headless server 200 would be ready for installing the VSP software. For example, the booting software 235 may execute the UPnP service software 236 and the RCP service software 238 on the headless server 200.

UPnP is a set of networking protocols that permits networked devices to seamlessly discover the presence of one another on the network, and to establish functional device-to-device network services between the devices for data sharing and communication purposes. UPnP adopts the concept of "services" and control points. A UPnP service is the smallest unit of control in a UPnP network. The UPnP service exposes actions and models its state with state variables standardized by the UPnP forum. A control point in a UPnP network is a controller capable of discovering and controlling other UPnP devices. After discovery of a UPnP device, a control point may retrieve the device description and get a list of associated services on the device, and invoke actions to control the service on the device. In this embodiment, by setting up the headless server 200 with UPnP, the headless server 200 becomes a UPnP device, such that other UPnP control points may have device-to-device communication with the headless server 200 via the network 110.

RPC is an inter-process communication that allows a computer program or application to cause a subroutine or procedure to execute in another address space, commonly on another remote computer on a shared network, without the programmer explicitly coding the details for this remote interaction. By setting up the RPC service on the headless server 200, RPC requests may be used to execute a specific procedure on the headless server 200.

Thus, with the UPnP and RPC services 236 and 238 being launched on the headless server 200, the management station 400 can discover the headless server 200 under UPnP, and use RPC calls to perform installation processes of the VSP 239 on the headless server 200.

Figure 4:
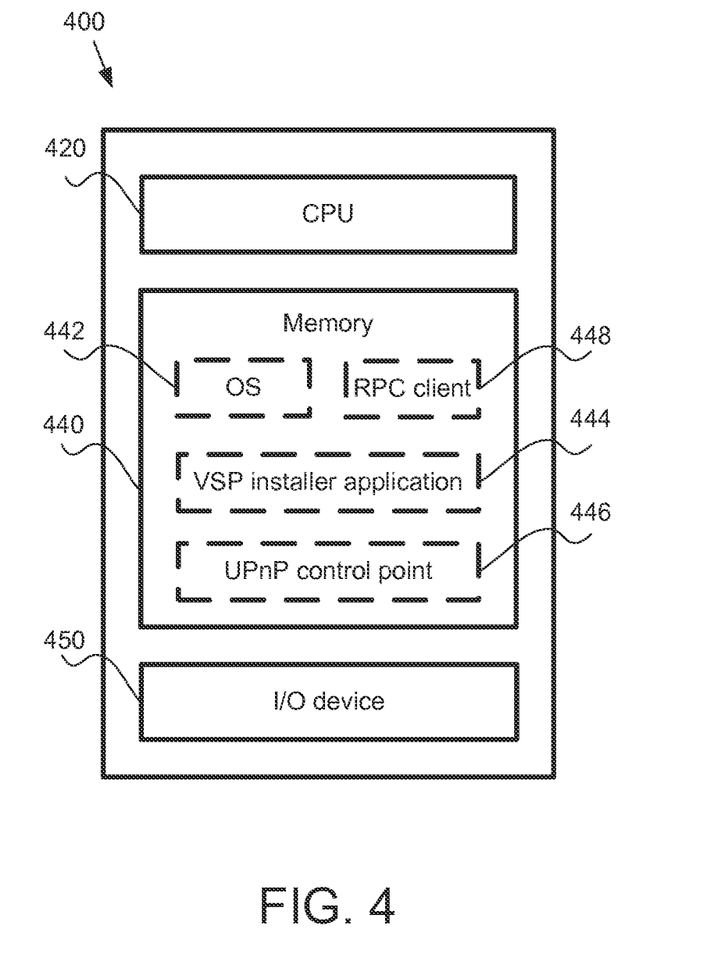
FIG. 4 schematically depicts a management station according to one embodiment of the present disclosure.

FIG. 4 illustrates the management station 400 of FIG. 1 according to one embodiment of the present disclosure. The management station 400 allows an administrator of the headless server 200 to control the headless server 200 remotely from the management station 400. Although not explicitly shown in FIG. 4, a chassis is provided to enclose various components or devices of the management station 400 One of ordinary skill in the art would appreciate that the management station 400 of FIG. 4 only represents an exemplary embodiment of the present disclosure, and therefore should not be considered to limit the disclosure in any manner. In certain embodiments, the management station 400 may include other physical or virtual components not shown in FIG. 4.

As shown in FIG. 4, the management station 400 includes a CPU 420 and a memory 440. The CPU 420 executes various programs loaded into the memory 440.

These programs include an OS 442, a VSP installer application 444, a UPnP control point software 446, and a RPC client software 448.

Figure 5:
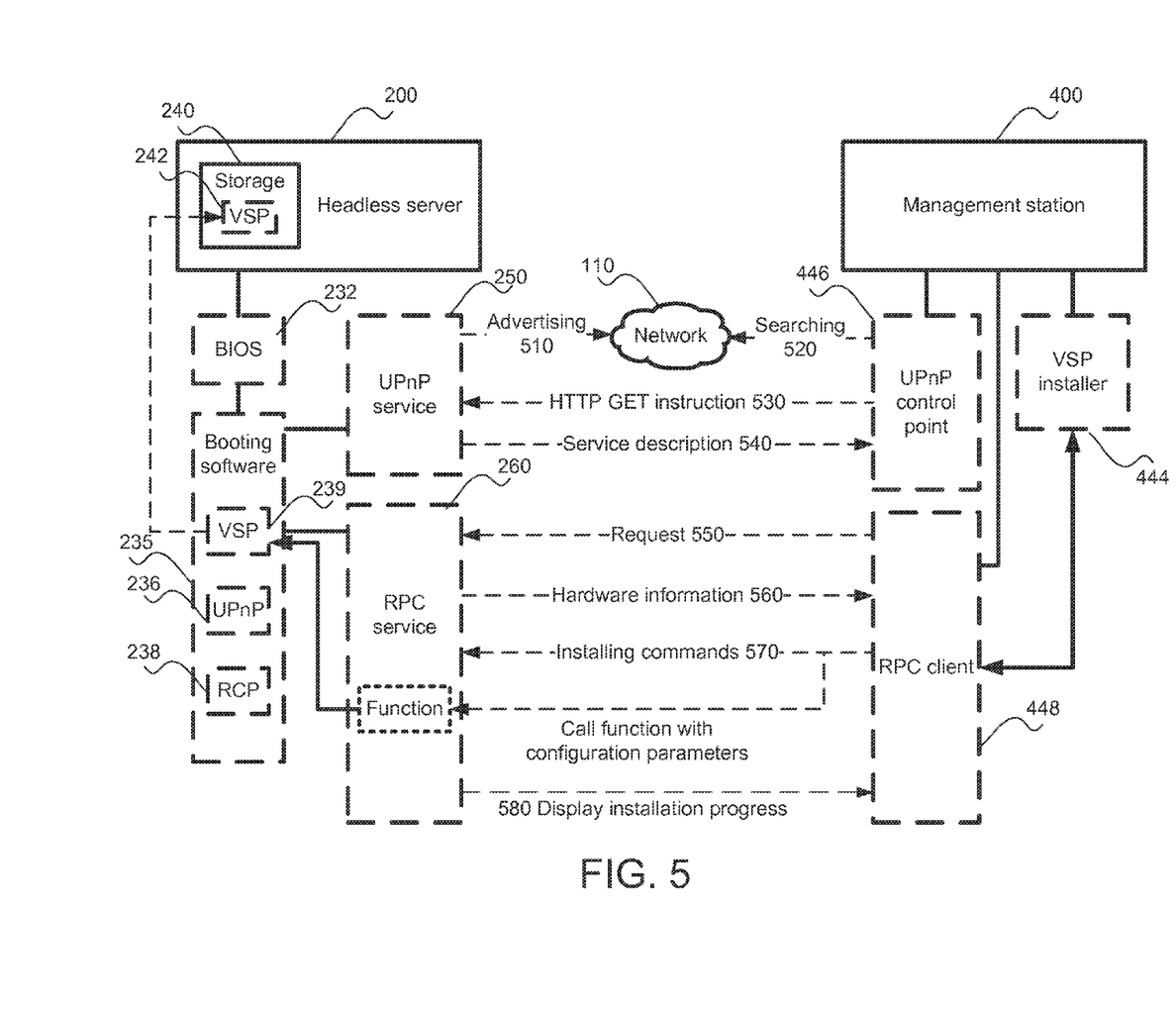
FIG. 5 schematically depicts the installing process of the VSP software from the management station to the headless server according to one embodiment of the present disclosure.

FIG. 5 shows the installing process of the VSP software at the headless server 200 according to one embodiment of the present disclosure, where the solid lines indicate execution of software applications, and dashed lines indicate transfer of data. As shown in FIG. 5, the BIOS 232 of the headless server 200 has already booted the booting software 235, and the booting software 235 has launched the UPnP service 250 and the RPC service 260 from the UPnP and RPC service software 236 and 238. Although not explicitly shown, the headless server 200 and the management station 400 may include other software and hardware elements to perform the remote installation process.

As discussed above, the UPnP service 250 is launched on the headless server 200, which is connected to the network 110. Thus, the UPnP service 250 performs an advertising process 510 by multicasting discovery messages on the network 110 to advertise itself. Thus, any interested control point on the network 110 can listen to the standard multicast address for notifications that new UPnP services 250 are available. The discovery messages will include a web link, such as a uniform resource locator (URL), from which to obtain device or service descriptions of the UPnP service 250, and a time stamp to indicate how long the advertisement is valid. Before this time expires, the UPnP service 250 must re-send its advertisement. Otherwise, control points can assume that the UPnP service 250 is no longer available.

Similarly, in the management station 400, the UPnP control point 446 is launched on the management station 400, which is also connected to the network 110. Thus, the UPnP control point 446 can perform a searching process 520 by multicasting discovery messages on the network 110 searching for interesting UPnP device and services. When the UPnP control point 446 finds the discovery messages advertised by the UPnP service 250, the UPnP control point 446 receives a response to the search request, which contains the same information in the discovery message of the advertisements from the UPnP service 250. Thus, the UPnP control point 446 issues an HTTP GET instruction on the URL from the discovery message, and the UPnP service 250 returns the service description, such that the UPnP control point 446 performs necessary configuration to enable the device-to-device connection under UPnP. The service descriptions of the UPnP service 250 includes, among other information, the IP address of the headless server 200. In this way, the UPnP control point 446 has the information of the UPnP service 250, and may invoke action on the UPnP service 250 by sending control messages to the UPnP service 250, thus establishing the UPnP connection.

When the UPnP connection is established, the management station 400 executes the VSP installer application 444, which is a software application customized for installation of the VSP software 239. The VSP installer application 444 then generates a request for the hardware information of the headless server 200 using the RPC call, such that installing commands for the VSP software 239 may be generated according to the hardware information. Specifically, the request may include commands issued by the VSP installer application 444, and instructions inputted by the user. Upon receiving the request, the RPC client 448 may process the request to the RPC call forms. When the RPC client 448 receiving the request, the RPC client 448 packs the request, and sends the packed request 550 to the RPC service 260 under UPnP. Specifically, the RPC packing action is generally referred to as "marshalling", which refers to converting the information being packed into a byte stream form suitable for communication of data. The packed request 550 for the hardware information may include instructions or commands for requesting specific hardware parameters of the headless server 200.

When the RPC service 260 receives the packed request 550, the RPC service 260 unpacks the packed request 550, and sends the commands in the unpacked request to the booting software 124 for retrieving the hardware information. The unpacking action is generally referred to as "unmarshalling", which refers to converting the byte stream form packed information back to the original information.

When the booting software 235 receives the instructions or commands according to the request 550, the booting software 235 retrieves the hardware information of the headless server 200 according to instruction, and sends the hardware information to the RPC service 260, such that the RPC service 260 performs the same marshalling process by packing the hardware information and sending the packed hardware information 560 back to the RPC client 448 under UPnP. The RPC client 448 then unpacks, or unmarshalls, the packed hardware information 560, and sends the unpacked hardware information to the VSP installer 444.

Upon receiving the hardware information, the VSP installer application 344 generates installing commands for the VSP software 239 according to the hardware information, and sends the installing commands to the RPC client 448. Similarly, the installing commands may include commands generated by the VSP installer 344, and instructions inputted by the user. In a similar marshalling process, the RPC client 448 packs the installing commands, and sends the packed installing commands 570 to the RPC service 260 under UPnP. Upon receiving the packed installing commands 570, the RPC service 260 performs a similar unmarshalling process to unpack the packed installing commands 570, and sends the unpacked installing commands 570 to the booting software 235. More specifically, the RPC client can call functions of the RPC service 260 with configuration parameters for configuring the VSP software 239. The configuration parameters can be determined by the VSP installer 444 based on the user inputs and the hardware information gathered by the RPC service 260. In certain embodiments, the VSP software 239 includes a hypervisor and a VSP stack. The hypervisor configuration parameters include domain configuration parameters, virtual memory configuration parameters, and virtual device configuration parameters. The VSP stack configuration parameters can include parameters for configuring at least one of: IPMI based management, sensor management, user management, remote server power control, common information model (CIM), web user-interface configuration, KVM and virtual media redirection, and other miscellaneous settings. In certain embodiments, the configuration parameters include installation parameters such as partition size and type as well as typical OS installation parameters. For example, the RPC service 260 can store those configuration parameters in a configuration file on the headless server 200 (e.g., in the storage 240). Thus, the booting software 235 interprets the installing commands and the RPC function 262, and installs the VSP software 239 to the storage 240 of the headless server 200 according to the installing commands and the configurations of the RPC function 262. Thus, the VSP software 242 is stored to the storage 240 of the headless server 200. The BIOS 232 of the headless server 200 may then boot the VSP software 242 from the storage 240.

In certain embodiments, at one or more operations 580, the RPC service can periodically send information regarding installation progress (e.g., the percentage of installation) to the RPC client. Accordingly, management programs running on the management station can obtain the installation progress information from the RPC client and display the installation progress to a user.

Figure 6:
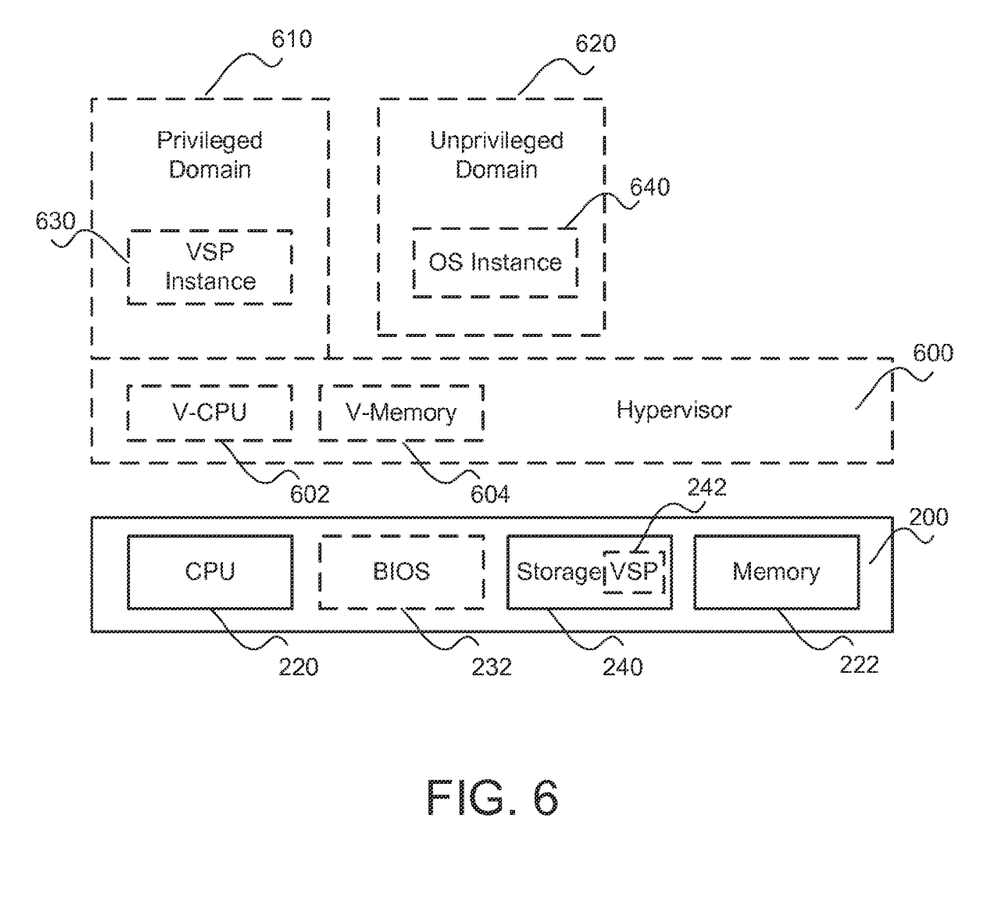
FIG. 6 schematically depicts operation of an installed VSP environment in the headles server according to one embodiment of the present disclosure.

FIG. 6 schematically depicts the operation of a VSP environment in the headless server 200 according to one embodiment of the present disclosure. As shown in FIG. 6, after the installation process, the VSP software 242 is stored in the storage 240 of the headless server 200. When the VSP software 242 is executed by the CPU 220, a hypervisor 600 runs on the headless server 200. The hypervisor 600 can be of various types and designs, such as XEN, MICROSOFT HYPER-V, VMWARE ESX, or other types of hypervisor. The hypervisor 600 can create domains, including a privileged domain 610, and an unprivileged domain 620 (i.e. the virtual machine). Thus, a VSP stack instance 630 may run in the privileged domain 510, and a guest OS 640 may run in the unprivileged domain (the virtual machine) 520. The guest OS 640 may be from an OS installed to the storage 240 after the installation of the VSP 242, or from a booting software 235 as described in the remote booting process as shown in FIG. 3.

The VSP instance 630, when running in the privileged domain 610, functions similarly to a physical system-on-a-chip BMC installed in a computer system, such as the headless server 200. For example, the headless server 200 can include different types of sensors, the VSP instance 630 may be capable of obtaining data from these sensors to obtain parameters and health, operating and performance-related aspects associated with the headless server 200, such as, but not limited to, the temperature of one or more components of the headless server 200, speed of rotational components (e.g., spindle motor, CPU Fan, etc.) within the headless server 200, the voltage across or applied to one or more components within the headless server 200, and the available or used capacity of memory devices within the headless server 200. For example, if a temperature sensor is disposed near the CPU 220, the VSP instance 630 may receive data from the temperature sensor and determine whether the CPU 220 exceeds a prescribed temperature. When the VSP instance 630 determines that the temperature of CPU 220 exceeds prescribed temperature, the VSP instance 630 may issue an instruction to the CPU fan to cool down the CPU 220. In certain embodiments, the VSP instance 630 may include various applications and software for, among other things, implementing different baseboard management functions. In certain embodiments, the VSP instance 630 can provide advanced monitoring features and more detailed hardware information (such as temperatures in different thermal zones).

In certain embodiments, the VSP instance 630 adheres to the Intelligent Platform Management Interface (IPMI) industry standard for system monitoring and event recovery. The IPMI standard is well-known to those of ordinary skill in the industry, and therefore not described in detail herein. Rather, revision 1.1 of the IPMI Specification, version 1.5, release date Feb. 20, 2002, is incorporated herein by reference.

After the VSP 242 is configured and stored in the storage 240, in a booting process, the BIOS 232, detecting a bootable device, instructs the CPU 220 to boot the VSP environment 242. Under the instruction of a boot loader in the VSP environment, the CPU 220 loads the hypervisor 600 into the memory 222 and executes the hypervisor 600. Then the hypervisor 600 initiates the VSP instance 630 in the privileged domain 610. The hypervisor 600 can also create a virtual machine (unprivileged domain) 620.

In certain embodiments, after the installation of the VSP environment 242 into the storage 240, an OS may be installed in the storage 240. The installation process of the OS is similar to the installation of the VSP 242. Specifically, an OS file may be sent to the storage 240 of the headless server 200 in a similar installation process as shown in FIG. 5. The hypervisor 600 is configured to load the OS stored in the storage 240 and run an OS instance 640 of the OS.

The foregoing description of the exemplary embodiments of the disclosure has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. For example, multiple probes may be utilized at the same time to practice the present invention. Accordingly, the scope of the present disclosure is defined by the appended claims rather than the foregoing description and the exemplary embodiments described therein.

What is claimed is:

1. A method of remotely installing a virtual service processor (VSP) to a computing device comprising:
   initiating a preboot execution environment (PXE) client at the computing device;
   receiving, at the PXE client, a VSP installation file from a PXE server, wherein the VSP installation file includes a VSP file, a universal plug and play (UPnP) service file, and a remote procedure call (RPC) service file;
   initiating a UPnP service based on the UPnP file at the computing device, wherein the UPnP service is discoverable by a management station in a network through UPnP;
   initiating a RPC service based on the RPC service file at the computing device;
   in response to a request from the management station and received at the RPC service, sending, at the computing device, hardware information of the computing device to the management station through the RPC service;
   receiving, at the computing device, configuration parameters for the VSP through the RPC service, wherein the configuration parameters configure functions of the VSP for managing at least one health or performance related aspect of the computing device; and
   installing, by the RPC service, the VSP on the computing device based on the VSP installation file and the configuration parameters.

2. The method as claimed in claim 1, further comprising:
   executing, at the management station, a VSP installer application;
   requesting, by the VSP installer application, the hardware information of the computing device through the RPC service at the computing device;
   receiving, by the VSP installer application, the hardware information of the computing device through a RPC client at the management station communicating with the RPC service; and
   sending, by the VSP installer application, the configuration parameters determined based on the received hardware information to the computing device through the RPC service.

3. The method as claimed in claim 1, comprising:
   discovering, by the PXE client, the PXE server;
   sending, by the PXE client, a request to download the VSP installation file from the PXE server; and
   receiving, at the computing device, the VSP installation file sent from the PXE server.

4. The method as claimed in claim 1, further comprising:
   initiating a UPnP control point at the management station, wherein the UPnP control point is configured to discover the UPnP service.

5. The method as claimed in claim 1, comprising:
   initiating, at the management station, an RPC client;
   generating, by the VSP installer application, the request for the hardware information of the computing device;
   packing, by the RPC client, the request, and sending the packed request to the RPC service of the computing device;
   unpacking, by the RPC service, the packed request, and obtaining the hardware information from the computing device according to the unpacked request;
   packing, by the RPC service, the hardware information, and sending the packed hardware information to the RPC client via the network; and
   unpacking, by the RPC client, the packed hardware information, and sending the unpacked hardware information to the VSP installer application.

6. The method as claimed in claim 1, comprising:
   generating, by the VSP installer application, the configuration parameters based on the hardware information of the computing device;
   packing, by the RPC client, the configuration parameters, and sending the packed configuration parameters to the RPC service of the computing device;
   unpacking, by the RPC service, the packed configuration parameters; and
   storing the VSP file at the computing device and configuring the VSP in accordance with the configuration parameters.

7. The method as claimed in claim 1, comprising:
   periodically sending information regarding installation progress from the RPC service to the management station; and
   displaying the installation progress at the management station.

8. The method as claimed in claim 1, wherein a BIOS of the computing device contains the PXE client.

9. The method as claimed in claim 1, wherein the computing device is a headless computer system having no monitor, keyboard, or mouse.

10. A system for remotely installing a virtual service processor (VSP), comprising: a computing device including
    a preboot execution environment (PXE) client initiated at the computing device, wherein the PXE client is configured to receive a VSP installation file from a PXE server, wherein the VSP installation file includes a VSP file, a universal plug and play (UPnP) service file, and a remote procedure call (RPC) service file;

a UPnP service initiated based on the UPnP file at the computing device, wherein the UPnP service is discoverable by a management station in a network through UPnP; and a RPC service initiated based on the RPC service file at the computing device, wherein the RPC service is configured to in response to a request from the management station and received at the RPC service, send hardware information of the computing device to the management station through the RPC service;

receive, at the computing device, configuration parameters for the VSP through the RPC service, wherein the configuration parameters configure functions of the VSP for managing at least one health or performance related aspect of the computing device; and install the VSP on the computing device based on the VSP installation file and the configuration parameters.

11. The system of claim 10, wherein the management station is configured to execute a VSP installer application;

wherein the RPC service is configured to receive a request for the hardware information of the computing device from the VSP installer application;

send to the VSP installer application, through a RPC client at the management station communicating with the RPC service, the hardware information of the computing device; and receive from the VSP installer application the configuration parameters determined based on the received hardware information to the computing device through the RPC service.

12. The system of claim 10, wherein the PXE client is configured to discover the PXE server;

send a request to download the VSP installation file from the PXE server; and receive the VSP installation file sent from the PXE server; and wherein the UPnP service is configured to be discoverable by a UPnP control point initiated at the management station.

13. The system of claim 10, wherein the system comprises an RPC client initiated at the management station, wherein the VSP installer application is configured to generate the request for the hardware information of the computing device;

wherein the RPC client is configured to pack the request and send the packed request to the RPC service of the computing device;

wherein the RPC service is configured to unpack the packed request and obtain the hardware information from the computing device according to the unpacked request;

wherein the RPC service is configured to pack the hardware information and send the packed hardware information to the RPC client via the network; and wherein the RPC client is configured to unpack the packed hardware information and send the unpacked hardware information to the VSP installer application.

14. The system of claim 10, wherein the VSP installer application is configured to generate the configuration parameters based on the hardware information of the computing device;

wherein the RPC client is configured to pack the configuration parameters and send the packed configuration parameters to the RPC service of the computing device;

wherein the RPC service is configured to unpack by the packed configuration parameters; and wherein the computing device is configured to store the VSP file and configure the VSP in accordance with the configuration parameters.

15. The system of claim 10, wherein the RPC service is configured to periodically send information regarding installation progress to the management station, and wherein the management station is configured to display the installation progress.

16. The system of claim 10, wherein a BIOS of the computing device contains the PXE client.

17. The system of claim 10, wherein the computing device is a headless computer system having no monitor, keyboard, or mouse.

18. First and second non-transitory computer storage media having different computer-executable instructions stored thereon which, when executed respectively by processors of a computing device and a management station, cause the processor of the computing device to:

initiate a preboot execution environment (PXE) client;

receive, at the PXE client, a VSP installation file from a PXE server, wherein the VSP installation file includes a VSP file, a universal plug and play (UPnP) service file, and a remote procedure call (RPC) service file;

initiate a UPnP service based on the UPnP file at the computing device, wherein the UPnP service is discoverable by a management station in a network through UPnP;

initiate a RPC service based on the RPC service file at the computing device;

in response to a request from the management station and received at the RPC service, send, at the computing device, hardware information of the computing device to the management station through the RPC service;

receive configuration parameters for the VSP through the RPC service, wherein the configuration parameters configure functions of the VSP for managing at least one health or performance related aspect of the computing device; and install, by the RPC service, the VSP based on the VSP installation file and the configuration parameters.

19. The non-transitory computer storage media of claim 18, wherein the instructions, when executed, cause the processor of the management station to execute a VSP installer application;

request, by the VSP installer application, the hardware information of the computing device through the RPC service at the computing device;

receive, by the VSP installer application, the hardware information of the computing device through a RPC client at the management station communicating with the RPC service; and send, by the VSP installer application, the configuration parameters determined based on the received hardware information to the computing device through the RPC service.

20. The non-transitory computer storage media of claim 18, wherein the instructions, when executed, cause the processor of the computing device to:

discover, by the PXE client, the PXE server;

send, by the PXE client, a request to download the VSP installation file from the PXE server; and receive the VSP installation file sent from the PXE server, and wherein the instructions, when executed, cause the processor of the management station to initiate a UPnP control point at the management station, wherein the UPnP control point is configured to discover the UPnP service.

21. The non-transitory computer storage media of claim 18, wherein the instructions, when executed, cause the processor of the management station to
initiate an RPC client;
generate, by the VSP installer application, the request for the hardware information of the computing device;
pack, by the RPC client, the request and send the packed request to the RPC service of the computing device; and
unpack, by the RPC client, the packed hardware information and send the unpacked hardware information to the VSP installer application;
wherein the instructions, when executed, cause the processor of the computing device to:
unpack, by the RPC service, the packed request and obtain the hardware information from the computing device according to the unpacked request; and
pack, by the RPC service, the hardware information and send the packed hardware information to the RPC client via the network.

22. The non-transitory computer storage media of claim 18, wherein the instructions, when executed, cause the processor of the management station to:
generate, by the VSP installer application, the configuration parameters based on the hardware information of the computing device; and
pack, by the RPC client, the configuration parameters, and sending the packed configuration parameters to the RPC service of the computing device;
wherein the instructions, when executed, cause the processor of the computing device to:
unpack, by the RPC service, the packed configuration parameters; and
store the VSP file at the computing device and configuring the VSP in accordance with the configuration parameters.

23. The non-transitory computer storage media of claim 18, wherein the instructions, when executed, cause the processor of the computing device to periodically send information regarding installation progress from the RPC service to the management station; and
wherein the instructions, when executed, cause the processor of the management station to display the installation progress at the management station.

24. The non-transitory computer storage media of claim 18, wherein a BIOS of the computing device contains the PXE client.

25. The non-transitory computer storage media of claim 18, wherein the computing device is a headless computer system having no monitor, keyboard, or mouse.

* * * * *